(12) United States Patent
Khanna et al.

(10) Patent No.: US 11,870,693 B2
(45) Date of Patent: Jan. 9, 2024

(54) KERNEL SPACE BASED CAPTURE USING INTELLIGENT PACKET SELECTION PARADIGM AND EVENT OUTPUT STORAGE DETERMINATION METHODOLOGY

(71) Applicant: Fortinet, Inc., Sunnyvale, CA (US)

(72) Inventors: Sameer T. Khanna, Cupertino, CA (US); Xiaoguang Liu, San Ramon, CA (US); Jianwen Zhang, Saratoga, CA (US)

(73) Assignee: Fortinet, Inc., Sunnyvale, CA (US)

( * ) Notice: Subject to any disclaimer, the term of this patent is extended or adjusted under 35 U.S.C. 154(b) by 41 days.

(21) Appl. No.: 17/139,382

(22) Filed: Dec. 31, 2020

(65) Prior Publication Data
US 2022/0210065 A1    Jun. 30, 2022

(51) Int. Cl.
*H04L 12/741* (2013.01)
*H04L 45/74* (2022.01)

(52) U.S. Cl.
CPC .................................. *H04L 45/74* (2013.01)

(58) Field of Classification Search
CPC ... H04L 45/66; H04L 47/196; H04L 63/0263; H04L 69/164; H04L 47/22; H04L 47/2441; H04L 47/32; H04L 47/23; H04L 63/0236; H04L 69/22
See application file for complete search history.

(56) References Cited

U.S. PATENT DOCUMENTS

| | | | |
|---|---|---|---|
| 2018/0097713 A1* | 4/2018 | Larson | G06F 9/50 |
| 2019/0050273 A1* | 2/2019 | Tamir | H04L 47/23 |
| 2019/0325302 A1* | 10/2019 | Savic | G06N 3/084 |
| 2020/0059514 A1* | 2/2020 | Buytenhek | H04L 47/125 |

OTHER PUBLICATIONS

Bekerman et al., "Unknown Malware Detection Using Network Traffic Classification", IEEE Conference on Communications and Network Security, 2015.
Meidan et al., "Detection of Unauthorized IoT Devices Using Machine Learning Techniques", Sep. 14, 2017.

* cited by examiner

*Primary Examiner* — Mansour Oveissi

(57) ABSTRACT

Systems and methods for efficient kernel space packet processing and IoT device classification are provided. According to an embodiment, a computer system receives a packet in kernel space, ascertains whether the packet is destined for the computer system, when the ascertaining is affirmative the packet is forwarded to user space; otherwise, it is determined whether the packet is associated with a protocol used by IoT devices. When the determination is affirmative, header information is extracted from the packet, and subsequent IoT device detection processing is facilitated by sending the header information to the user space. The same or a separate computer system may perform the IoT device detection processing based on the header information by for each identified TCP or UDP flow: creating a variable-length feature set; and inferring whether the TCP or UDP flow represents an IoT device or a non-IoT device communication by applying an ML model.

20 Claims, 13 Drawing Sheets

KERNEL SPACE HIGH PERFORMANCE PACKET PROCESSING SYSTEM
202

INCOMING PACKET RECEIVING MODULE
204

INTELLIGENT PACKET DROPPING MODULE
206

EVENT OUTPUT STORAGE MODULE
214

KERNEL SPACE BASED CAPTURE USING INTELLIGENT PACKET SELECTION PARADIGM AND EVENT OUTPUT STORAGE DETERMINATION METHODOLOGY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present disclosure generally relate to the Internet of Things (IoT) devices and network security technology. In particular, embodiments of the present disclosure relate to kernel space packet processing and detection/classification of IoT devices.

Description of the Related Art

The presence of the Internet of Things (IoT) devices in a network (e.g., an enterprise network) is creating security challenges for network security managers. New IoT devices are continually being introduced and are being connected to enterprise networks. The number of IoT devices connected to networks is expected to reach 75.44 billion worldwide by 2025. As these devices are not created with stringent security measures, these devices represent an issue in the network security space due to their vulnerability to various attacks. According to PrivSec Report, 47% of the most vulnerable devices are security cameras installed on home networks, followed by smart hubs (15%), like Google Home and Amazon Alexa, and network-attached storage (NAS) devices (12%).

SUMMARY

Systems and methods are described for efficient kernel space packet processing and IoT device classification. According to one embodiment, a processing resource of a computer system performs kernel space packet processing. A packet is received in kernel space of an operating system of the processing resource. It is ascertained in the kernel space whether a destination address of the packet matches a logical address of the computer system. When the ascertainment is affirmative, the packet is forwarded to user space of the operating system by passing the packet up a network stack implemented by the operating system. When the ascertainment is negative, a determination is made in the kernel space regarding whether the packet is associated with one or more predetermined protocols used by Internet of Things (IoT) devices. When the determination is affirmative: header information is extracted from the packet; and subsequent IoT device detection processing is facilitated by sending the header information to the user space. When the determination is negative, the packet is dropped.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1:
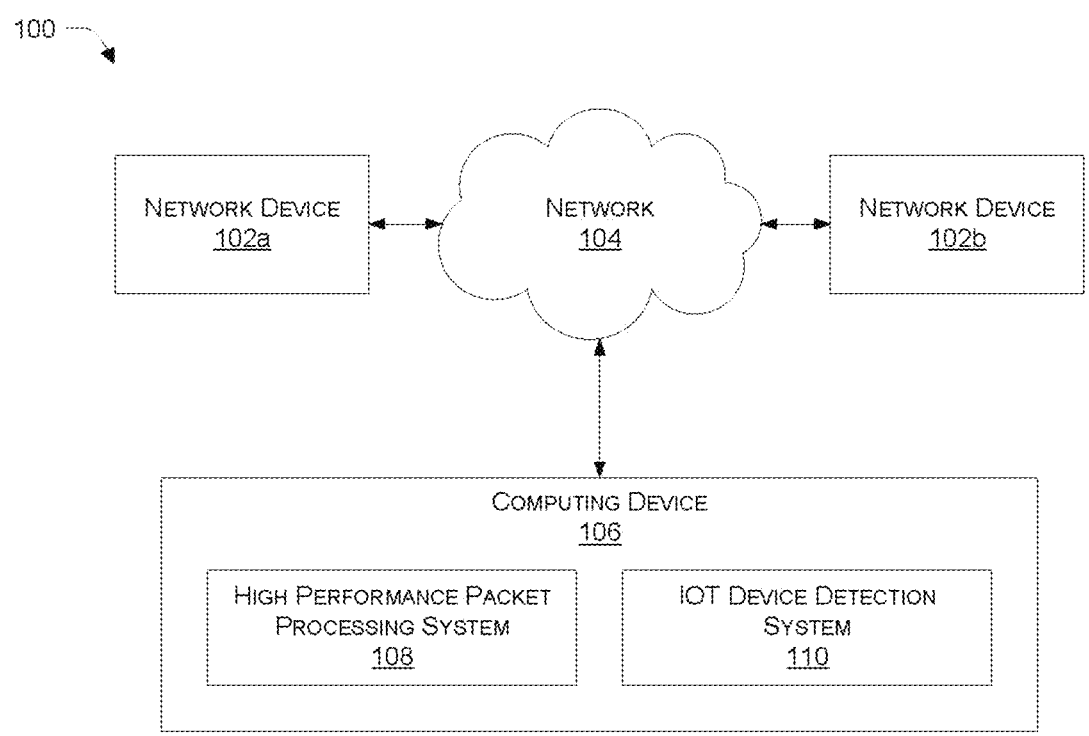
FIG. 1 illustrates an example network environment from which packets are captured for efficient kernel space packet processing and IoT device detection in accordance with an embodiment of the present disclosure.

Systems and methods are described for efficient kernel space packet processing and IoT device classification. When connected to a network (e.g., an enterprise network), IoT devices, due to their general lack of security measures, increase the exposure of the network and other resources connected to the network to attacks by malicious actors. Security managers are becoming increasingly concerned as these IoT devices are now commonly connected to critical resources (e.g., smartphones, laptop computer systems, etc.), where important data and credentials may be stored. As such, it is desirable to be able to identify the IoT devices connected to a network to, among other things, monitor the activities of these devices and address the vulnerabilities created by these devices.

Hundreds of new IoT devices are currently being introduced each month, making the manual writing of rules to perform IoT device classification impractical and motivating research in the machine-learning (ML) space. Existing research, however, relating to the uses of ML models to accurately recognize IoT devices has a number of flaws. Most IoT detection studies are relatively small scale, for example, relating to a home network having only a few connected IoT devices at a time. Additionally, although claiming high accuracies in detecting IoT devices, a number of the ML-based studies fail to separate training data from testing data and use the same IoT devices for both trainings as well as for testing the ML model accuracy for detecting IoT devices. Such studies do not inspire much confidence in the ability of the ML models at issue to handle new IoT devices. Meanwhile, it would be desirable to avoid the need for frequent retraining of the machine-learning (ML) model to recognize the new IoT devices as they are introduced.

Another issue with existing studies is the use of large feature sets for classification. For example, Bekerman et al. (Unknown malware detection using network traffic classification. In: 2015 IEEE Conference on Communications and Network Security (CNS). pp. 134-142 (September 2015)) use 927 features to identify malware by analyzing network traffic, and Meidan et al. (Detection of unauthorized IoT devices using machine learning techniques. CoRR abs/1709.04647 (2017), http://arxiv.org/abs/1709.04647) propose the use of 274 features. Having too many features leads to the curse of dimensionality, making the vector space too sparse, requiring large amounts of data to train the ML models, and ultimately lowering the accuracy considerably, especially in large-scale environments.

Various embodiments described herein seek to efficiently and automatically identify IoT devices by their network information in large-scale environments, potentially including thousands of unique IoT devices, by making use of intelligent packet dropping during kernel space packet processing and a novel feature extractor.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, or by human operators or the combination thereof.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details.

Terminology

Brief definitions of terms used throughout this application are given below.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, an "Internet of Things device" or an "IoT device" generally refers to an electronic device (typically, a non-traditional computing device including one or more sensors and programmed to perform a standalone or special-purpose application) that is capable of connecting to the Internet, for example, via a wired or wireless connection to send data, receive instructions or both. IoT devices may communicate with each other via the network (e.g., a wireless home or enterprise network) to which they are directly connected and/or via the Internet. IoT devices are often controlled and/or configurable via another device (e.g., via an app installed on a smartphone or computer). Non-limiting examples of IoT devices include smart speakers (e.g., Amazon Alexa or Google Home), smartwatches (e.g., an Apple Watch), internet-connected baby monitors, "smart home" products (e.g., home security systems, video doorbells, light bulbs, and thermostats), Internet-connected "smart" versions of traditional appliances (e.g., televisions, refrigerators, and lighting fixtures), and "smart" toys.

As used herein, "kernel space packet processing" generally refers to high-speed packet processing performed within the kernel of an operating system. Non-limiting examples of kernel space packet processing include the Data Plane Development Kit (DPDK), which is a set of libraries and drivers for fast packet processing, eXpresss Data Path (XDP), and an extended Berkley Packet Filter (eBPF)-based high-performance data path that is part of the Linux kernel.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPsec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), and DoS attack detection appliances (e.g., the FORTIDDOS family of DoS attack detection and mitigation appliances).

FIG. 1 illustrates an example network environment 100 from which packets are captured for efficient kernel space packet processing and IoT device detection in accordance with an embodiment of the present disclosure. A computer device 106 receives packets directed to or originated by network devices (e.g., network device 102a or network device 102b) and/or other devices (e.g., IoT devices) connected to a network 104. The computer device 106 may receive a copy of traffic passing through network 104 and use high-performance packet processing system 108 to extract packet information in kernel space of the operating system and pass the packet information to an application running in user space of the operating system for further processing. The system 108 may use an eXpress Data Path (XDP) hook to capture packets from regular network traffic without disturbing the regular traffic. The system 108 may use extended Berkeley packet filter (eBPF) maps that are already built into the Linux kernel for processing packets captured from the network environment 100. The packets may be conveyed to an eBPF program by the XDP hook implemented within a network device driver of the computer system.

In one embodiment, system 108 receives a copy of packets passing through network 104 from a switch (not shown) configured to perform port mirroring. In an alternative embodiment, the system 108 may be implemented on one of the network devices 102a-b. Regardless of the device on which the system 108 is implemented, the device performing the kernel space packet processing and detection/classification of IoT devices may be referred to herein as a packet capturing device. Packet information relating to the captured packets that use one or more predetermined network protocols and for which logical destination address does not match with the logical address of the packet capturing device are passed to the IoT device detection system 110. One or more processing units (e.g., processor, core, or thread) can be used for capturing the network packet, extracting header information from the captured packet when the packet relates to one of the predefined protocols and storing header information extracted from the packets to a memory unit.

In an embodiment, the high-performance packet processing system 108 is implemented on the computer device 106. System 108 receives a packet in the kernel space of an operating system, ascertains in the kernel space whether a destination address of the packet matches a logical address of the computer device, and forwards the packet up a network stack implemented by the operating system if the destination address of the packet matches the logical address of the computer device 106. When the destination address of the packet does not match the logical address of the computer device 106, the high-performance packet processing system 108 determines in the kernel space whether the packet is associated with one or more predetermined protocols listed as a protocol of interest by an application running in user space, and if so extracts header information from the packet. The system 108 stores the packet information in the memory unit attached with the computer device 102. The packet information is read by the application (e.g., an application associated with IoT device detection) running in the user space. When it is determined that the packet is not associated with one or more predetermined protocols of interest, the system 108 drops the packet. The one or more predetermined protocols of interest, for example, may include Transmission Control Protocol (TCP) and User Datagram Protocol (UDP).

In one embodiment, the computer system sends the header information to the user space by storing the header information within a data structure in a memory of the computer system that is accessible to the user space. A program running in the user space reads the header information from the data structure and stores the header information to a packet capture file on a storage device.

In an embodiment, the application running in the user space may relate to an Internet of Thing (IoT) detection system 110. The high-performance packet processing system 108 determines in the kernel space whether the packet is associated with one or more predetermined protocols used by Internet of Things (IoT) devices, and when said determination is affirmative, extracts header information from the packet. The system 108 stores the packet information in the memory unit attached with the computer device 102. The packet information is read by the application associated with the IoT device detection system 110 running in user space.

The header information extracted by the system 108 is stored in the memory and read from memory by the IoT device detection system 110. The header information is written and read using an event output storage (EOS) protocol. The device 106 may choose the EOS protocol to be used for writing and reading from memory using from a group of EOS protocols that includes a pragma OpenMP (OPM) protocol, a Multi-Producer Single Consumer (MPSC) protocol, and a Multiple Single Producer Single Consumer (MSPSC) protocol. A suitable EOS protocol may be selected based on their respective performance in a given environment. The performance of the EOS may be tested by forwarding, by a processing unit of the computer device 106, header information of packets at the maximum rate for storage in the memory and calculating accuracy of a particular EOS protocol by determining a ratio of a number of correctly written packet headers in the memory over the total number of packets sent to the memory. The particular EOS protocol is said to have satisfactory performance if the ratio is greater than a threshold.

In an embodiment, the device may start using the pragma OMP protocol as a default protocol, determine whether the performance of pragma OMP protocol is satisfactory, and continue using the pragma OMP if the performance of the Pragma OMP is satisfactory. When it is determined that the performance of the pragma OMP is not satisfactory, device 106 may add an additional processing core or an additional processing thread for reading the header information, tries the MSPSC protocol, evaluates the performance of the MSPSC protocol, and continues with the MSPSC protocol, in response to the evaluation that the performance of the MSPSC protocol is satisfactory. In response to the evaluation that the performance of the MSPSC protocol is not satisfactory, the system may increase a ratio of a number of processing cores writing the header information to the memory over a number of processing cores reading from memory, try the MPSC protocol, test the performance of the MPSC protocol, and continue with the MPSC protocol if the test of the MPSC protocol indicates satisfactory performance. If the performance is not satisfactory, even after increasing the ratio of the number of processing units (core or thread) writing to the memory and the number of processing units reading from memory, the system may increase the speed of the memory.

As described in further detail below, in an embodiment, the IoT device detection system 110 receives packet header information corresponding to a plurality of packets and identifies based on the packet header information a plurality of TCP or UDP flows between a given source device of a plurality of devices and a given destination device of the plurality of devices. For each TCP or UDP flow of the plurality of TCP or UDP flows, the system 110 creates a variable length feature set having a size limited by a predetermined or configurable aggregate number of packets sent and received for the TCP or UDP flow, and infers whether the TCP or UDP flow represents an IoT device communication or a non-IoT device communication by applying a machine-learning model to the variable length feature set. The system 110 may classify the plurality of devices as either an IoT device or a non-IoT device by aggregating one or more results of said inferring for each device of the plurality of devices using a voting classifier.

The system 110 may organize the packet header information based upon their respective TCP or UDP bidirectional flows that are determined based on any or combination of Media Access Control (MAC) addresses contained within the packet header information, TCP or UDP ports contained within the packet header information, and Internet Protocol (IP) addresses contained within the packet header information. In one embodiment, the system 110 creates the variable-length feature set from information regarding the TCP or UDP flow and packet information such as the size, a Time-To-Live (TTL) value, and Inter-Arrival-Time (IAT) derived from with the packet header information.

Other applications or systems designed for specific purposes, such as quality of service control, resource usage planning, malware detection, intrusion detection, and rogue DHCP server identification, can read the packet information extracted by the high-performance packet processing system 108 and run specific logic to perform specific functions.

Figure 2A:
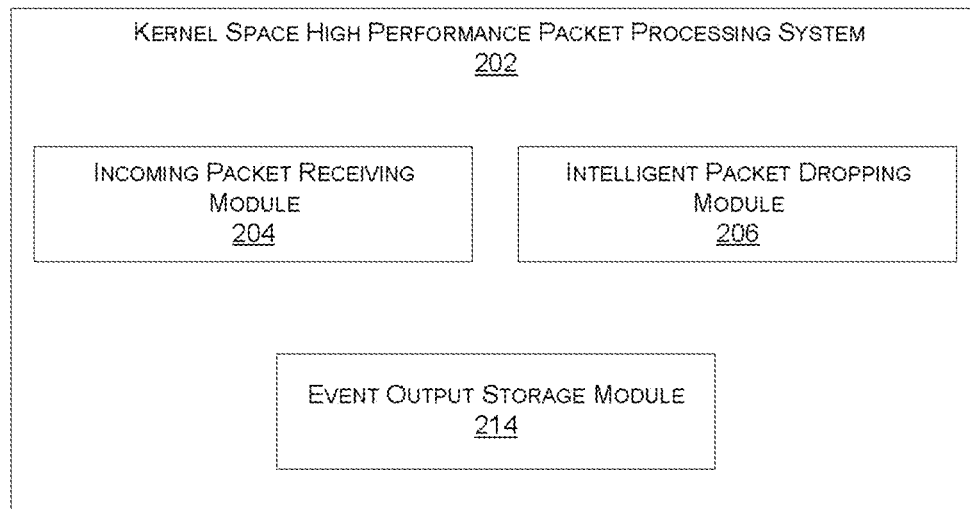
FIG. 2A illustrates functional modules of an efficient kernel space packet processing system in accordance with an embodiment of the present disclosure.

FIG. 2A illustrates functional modules of an efficient kernel space packet processing system 202 in accordance with an embodiment of the present disclosure. In the context of various examples described herein, the system 202 may use kernel space packet processing (e.g., XDP or DPDK). XDP has been shown to be capable of dropping up to 10 million packets per second. While this type of speed is helpful to monitor the network activity within an enterprise network, it does not leave any cycles for any packet processing (e.g., no packets are forwarded and no packets are sent to user space for analysis). A computer system running XDP code and dropping 10 million packets per second would likely be unable to access the Internet. As such, the computer system would not be able to receive updates or patches and would not allow for remote monitoring of activity. To mitigate these negatives of using XDP while also trying to keep the computer system online, various embodiments described herein perform intelligent packet dropping. In one embodiment, if a packet's original destination is the computer running the XDP program, the hook is not expected to handle this packet. So, the packet is passed up the network stack in order to allow normal functionality. Alternatively, if the packet is useful for IoT device detection, packet header information is sent to the user space for subsequent processing and the packet is dropped. If neither are the case, then the packet is dropped.

In the context of the present example, the system 202 includes an incoming packet receiving module 204, an intelligent packet dropping module 206, and an event output storage module 214. According to one embodiment, the incoming packet receiving module 204 runs in kernel mode of a computing device (e.g., computing device 106) to receive network packets from a network environment (e.g., network environment 100) without disturbing regular network traffic. In one embodiment, the packets are received from regular traffic flow using an XDP hook. On receiving the packets, the intelligent packet dropping module 206 ascertains for each captured packet whether the packet is destined to the computing device on which the system 202 is implemented. If the packet is destined to the same computing device, system 202 passes the packet up the network stack of the operating system in order to allow processing of such traffic. If module 206 determines the packet is not destined for the same computer device, the packet is further evaluated to determine whether the packet is one useful for IoT device detection. For example, it may be determined whether the packet is associated with one or more configurable or predetermined protocols (e.g., TCP or UDP). According to one embodiment, if the packet is neither a TCP nor a UDP packet, module 206 drops the packet. If the packet is a TCP packet or a UDP packet (which are generally used by IoT devices), module 206 may extract header information (e.g., the first 78 bytes from the packet) from the packet or pass the packet to another module for header extraction. As those skilled in the art will appreciate, the IoT classification described herein may be performed based solely on packet header information and without the need to look at packet payloads. In this manner, system 202 will work for nonencrypted as well as for encrypted communications.

In an embodiment, the event output storage module 214 stores the header information in a memory unit using a suitable EOS protocol. For example, an application program running in user space may detect the packet header information via a polling system from memory. Storing and reading data using the EOS protocol does not require a processing unit to constantly search for the header information of a new packet. As such, usage of suitable EOS protocol leads to lower power consumption and hence improves the energy-efficient of the system 202. In one embodiment, module 202 may select to use pragma OMP protocol, MSPSC protocol, or MPSC protocol. For example, module 202 may identify a suitable EOS protocol to be used for a given network environment at runtime. The pragma OMP is an atomic approach to data consumption. Pragma OMP is easy to implement and intuitive. The module 202 may set pragma OMP as the default EOS protocol, as it is useful in most circumstances. However, pragma OMP maximizes packet retrieval performance at the expense of I/O performance. Module 202 may alternatively use MSPSC, which is a lockless approach to data consumption. MSPSC focuses more on maximizing I/O performance than packet retrieval performance and exhibits best performance in a computer system having greater than four processor cores. MSPSC is a suitable implementation when packets need to be written to disk as fast as possible. In cases where the Pragma OMP or the MSPSC approach is not found to be suitable, the MPSC approach can be used. MPSC is a pseudo-lockless approach to data consumption and focuses more on maximizing I/O performance than packet retrieval performance. MPSC may be a suitable implementation for a computer system having a processor core count of four or fewer.

Another module (not shown) may cause system 202 to select a suitable EOS protocol to use depending on the requirements. In an embodiment, this module may test the performance of a selected EOS protocol. Depending on the result of the test, the module may recommend switching from one EOS protocol to another. The module may also recommend the addition of processing units to capture the packets at a faster rate or the addition of processing units to read from the header information from memory and store it in a packet capture (PCAP) file on the disk. If the EOS performance is still not satisfactory after switching between the EOS protocols and the addition of processing units, the module may recommend changing the speed of the memory unit.

Once the extracted packet header information is written, the application associated with the IoT device detection can process the packet information to detect IoT devices in the network.

Figure 2B:
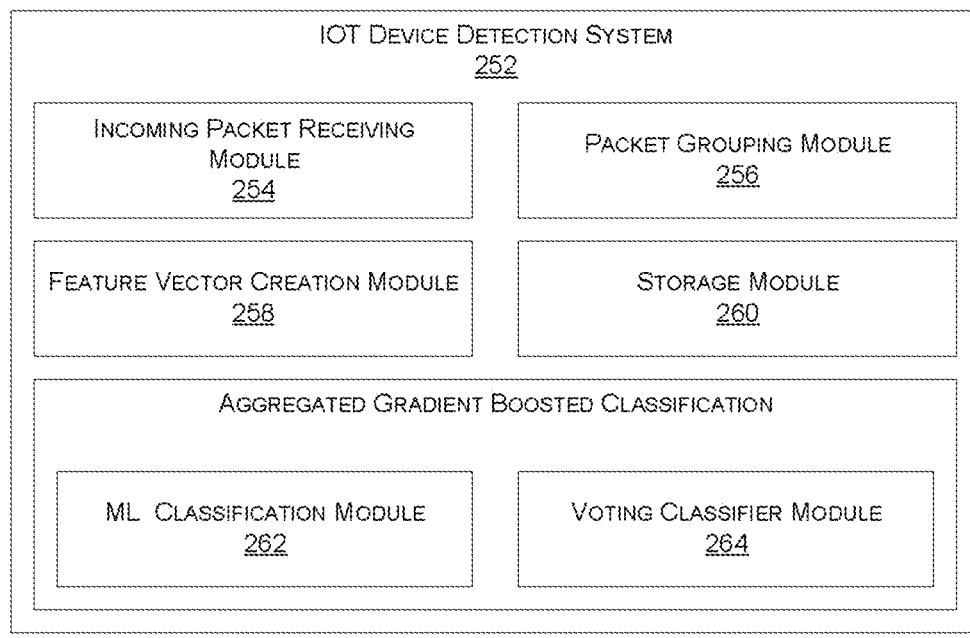
FIG. 2B illustrates functional modules of an IoT device detection system in accordance with an embodiment of the present disclosure.

FIG. 2B illustrates functional modules of an IoT device detection system 252 in accordance with an embodiment of the present disclosure. Depending upon the particular implementation, kernel space packet processing (e.g., performed by the kernel space high performance packet processing system 202) and the IoT device detection (e.g., performed by the IoT device detection system 252) may be implemented on the same or different computer systems. In the context of the present example, the IoT device detection system 252 includes an incoming packet receiving module 254, a packet grouping module 256, a feature vector creation module 258, and a storage module 260. The packet information receiving module 254 receives packet header information corresponding to a plurality of packets. Module 254 may read the header information from the memory unit. The packet grouping module 206 may be operable to identify, and group, based on the packet header information, a plurality of TCP or UDP flows between a given source device of multiple network devices and a given destination device of the multiple network devices. In an embodiment, the packet grouping module 256 organizes the packet header information based upon their respective TCP or UDP bidirectional flows based on any or combination of Media Access Control (MAC) addresses contained within the packet header information, TCP or UDP ports contained within the packet header information, and Internet Protocol (IP) addresses contained within the packet header information. The organization of the packets allows the system 252 to isolate packets associated with certain communications. For example, packets relating to a device doing multiple things at the same time can be identified once the packets are organized in this manner.

In one embodiment, the feature vector creation module 258 creates, for each TCP or UDP flow of the plurality of TCP or UDP flows, a variable-length feature set having a size limited by a predetermined or configurable aggregate number of packets sent and received for the TCP or UDP flow. The variable-length feature set is represented in the form of a feature vector. According to one embodiment, the variable-length feature set includes information regarding the TCP or UDP flow, the size of the packet, a Time-To-Live (TTL) value derived from the packet header information, and an Inter-Arrival-Time (IAT) derived from the packet header information. It has been observed that many IoT devices have their own customized packet-based information delivery system. By only using information (features) that every TCP or UDP packet must include, a large number of IoT devices can be detected.

In an embodiment, a variable-length feature set (feature vector) may include features extracted from a number of packets (N) from a given source to be evaluated for a given bidirectional flow. A total of 2N packets may be evaluated per flow to create the feature vector and the variable N may represent a configurable or predetermined number of packets sent and received that are to be used to create the feature vector. As those skilled in the art will appreciate, in the context of the present disclosure, the number of packets (N) related to a flow that is used to create the feature set is directly related to tradeoffs among various factors, including the efficiency and accuracy, of the ML model 262. The variable number (N) of packets used to create a feature vector allows for fine-tuning of the feature vector for different environments. For example, if an organization has only a few IoT devices, the number N can be kept very low. Keeping the number N low will increase the speed of the detection system. Alternatively, if the organization has a large variety of IoT devices, the value of N can be set higher to improve resolution and, thus, the accuracy of IoT device detection. As such, the variable number N allows the system to be configured for an appropriate combination of speed and accuracy for a given environment. A suitable value of N may be determined empirically.

For example, based on a desired prediction probability threshold, the ML model 262 may be trained and model performance may be evaluated for a given value of N via accuracy and precision metrics and N may be increased if the model precision is lower than desired or decreased if the model accuracy is higher than needed or if the feature matrix becomes too sparse (too many zeros). According to one embodiment, the feature vector creation module 258 may select a given N for the particular network environment as the lowest value with satisfactory performance metrics. Alternatively, N may be an administrator configurable parameter.

In the context of the present example, the system 252 utilizes an aggregated gradient boosted classification for classifying IoT devices in the network. Each flow may be classified as either belonging to an IoT device or a non-IoT device (e.g., a traditional multifunction computer). Results for each TCP or UDP flow associated with a particular device (e.g., identified via MAC address) may then be aggregated together to produce a final result. For example, using the feature vector, the machine learning classification module 262 may infer whether a given TCP or UDP flow associated with a particular device represents an IoT device communication or a non-IoT device communication. Then, a voting classifier module 264 may classify the particular device as either an IoT device or a non-IoT device by aggregating one or more results of the ML classification module 262. This process may be repeated for each device of the plurality of devices observed on the network and the classification results may be stored in a database accessible to system 252 (e.g., via the storage module 260).

IoT devices are generally designed to perform a limited set of functions, and the traffic behavior of the IoT devices are therefore limited to certain identifiable patterns. Since IoT devices are highly predictable in nature, the traffic behavior of an IoT device will be very consistent over time and dissimilar to that of non-IoT devices (e.g., smartphones, laptops, and other traditional multifunction computing devices), which will typically exhibit a diverse set of traffic behaviors over time. As such, training of the ML module 262 may leverage the fact that IoT devices are generally designed to perform a limited set of functions and corresponding limited set of traffic behavior.

The IoT device detection system 252 can detect new IoT devices that it has not seen before, as the system need not rely on the manual writing of custom rules for each new type of IoT device. Rather, in accordance with various embodiments described herein, IoT devices are instead detected based on their predicable traffic patterns resulting from their limited and focused functionality. In this manner, the IoT device detection system 252 may distinguish between IoT devices and non-IoT devices with high accuracy based on a relatively small number of features (e.g., less than 100 and typically on the order of between about 40 and 80—assuming about 5 features per packet) thereby avoiding the curse of dimensionality resulting from the use of too many features.

The various functional components, engines, and modules (e.g., the high performance packet processing system 108 and 202 and the IoT device detection system 110 and 252) and other functional units described herein and the processing described below with reference to the flow diagrams of FIGS. 3-4, 6-8, 9A-B, 10-12 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 13 below.

Figure 3:
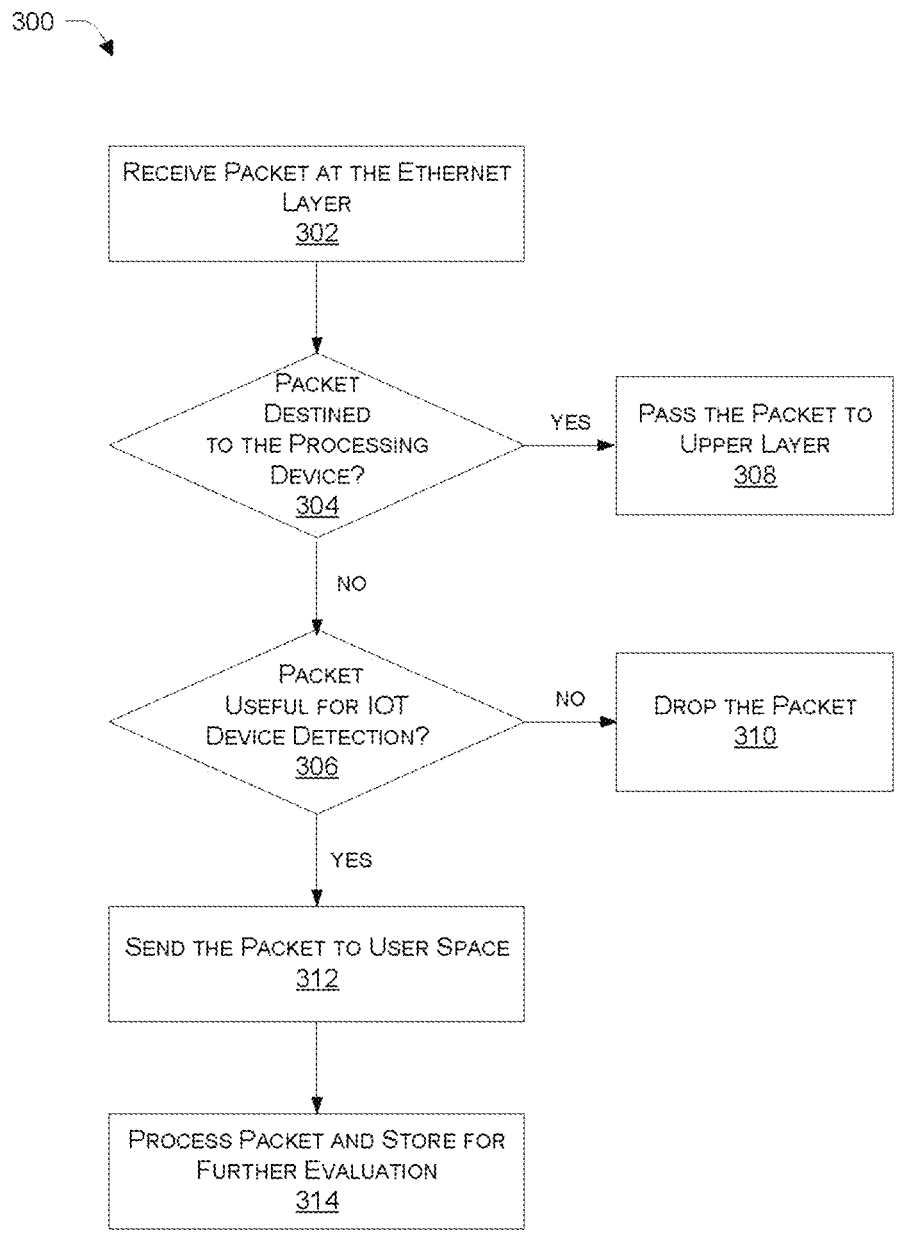
FIG. 3 is a high-level flow diagram illustrating kernel space packet processing in accordance with an embodiment of the present disclosure.

FIG. 3 is a high-level flow diagram illustrating kernel space packet processing in accordance with an embodiment of the present disclosure. A computing device (which may also be referred to herein as a processing device) receives the packet at the Ethernet layer as shown in block 302, and determines whether the packet is destined for the processing device as shown in block 304. In response to an affirmative determination, the computing device passes the packet to the network stack implemented by the operating system, as shown in block 308. In response to a negative determination, the computing device further determines whether the packet is useful for IoT device detection, as shown in block 306. In the context of various embodiments, a packet is useful for device detection when the packet is either a TCP packet or a UDP packet. When the packet is determined to be useful for IoT detection, then the packet or a portion thereof (e.g., the packet header) may be sent to user space for further processing, as shown at block 312; otherwise, the packet is dropped at block 310. The computing device processes the packet (or portion thereof) and stores header information extracted from the packet for further processing, as shown at block 314.

Figure 4:
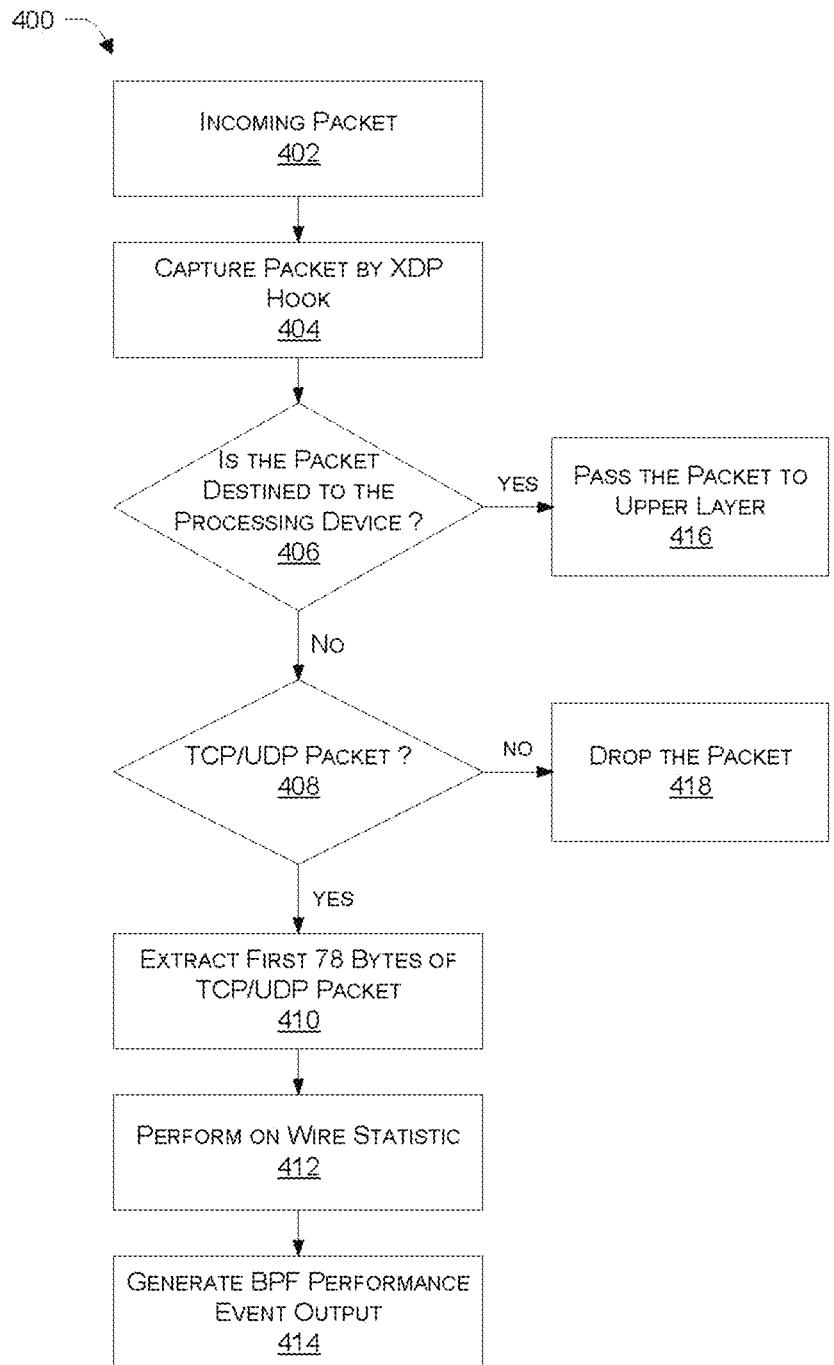
FIG. 4 is a flow diagram illustrating efficient kernel space packet processing by extracting header information in accordance with an embodiment of the present disclosure.

FIG. 4 is a flow diagram illustrating efficient kernel space packet processing by extracting header information in accordance with an embodiment of the present disclosure. In an embodiment, a computer device connected to a network detects an incoming packet as shown at block 402, captures the packet in kernel space using an XDP hook as shown at block 404, and makes the determination whether the packet is destined for the processing device as shown at block 406. As described above, responsive to an affirmative determination in block 406, the computing device passes the packet to user space via the network stack of the operating system, as shown at block 416. Responsive to a negative determination in block 406, the computing device further checks if the packet is a TCP/UDP packet, as shown in block 408. When the packet is determined to be a TCP or a UDP packet, the computing device extracts packet header information (e.g., the first 78 bytes of the TCP/UDP packet), as shown at block 410; otherwise, the computing device drops the packet as shown at block 418. The computer device further writes the extracted header information at wire speed to a memory. The device may further perform on-wire statistics as shown at block 412 based on the header information. The device may use eBPF tools to perform on-wire statistics and generate BPF performance event output as shown at block 414 and as described in further detail below.

Figure 5:
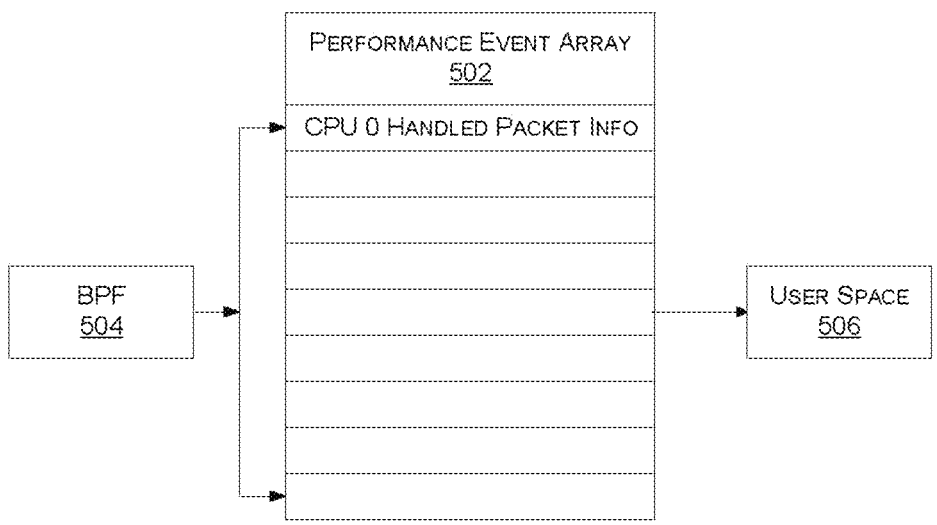
FIG. 5 illustrates memory management for storage of BPF performance event output in accordance with an embodiment of the present disclosure.

FIG. 5 illustrates memory management for storage of BPF performance event output in accordance with an embodiment of the present disclosure. As shown in FIG. 5, the BPF performance event output 504 is stored in memory in the form of a performance event array 502. For each processing unit (e.g., processor or processor core) writing the BPF performance event output information, a fixed memory slot is assigned. For example, the BPF performance event output from a packet handled by CPU 0 is written at the position assigned to CPU 0 in the performance event array 502. An application program, for example, an IoT device detection program running in user space 506, can read from the performance event array 502. An event EOS protocol can be used for writing the event output information in the memory and for reading the event output information from memory by an application running in user space. The event output information may include header information extracted from the packet.

Figure 6:
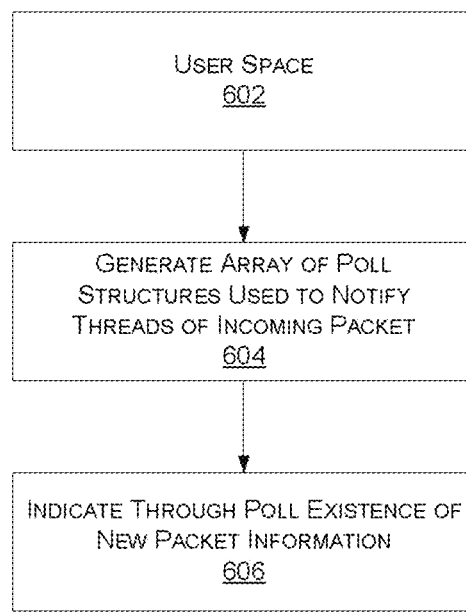
FIG. 6 illustrates functional blocks for packet processing in user space in accordance with an embodiment of the present disclosure.

FIG. 6 illustrates functional blocks for packet processing in user space in accordance with an embodiment of the present disclosure. In user space, the event output information is read from memory. As shown in FIG. 6, a script running in user space 602 may generate an array of poll structures used to notify threads of incoming packets, as shown at block 604. The script indicates through a poll the existence of new packet information as shown at block 606 to an application program.

Figure 7:
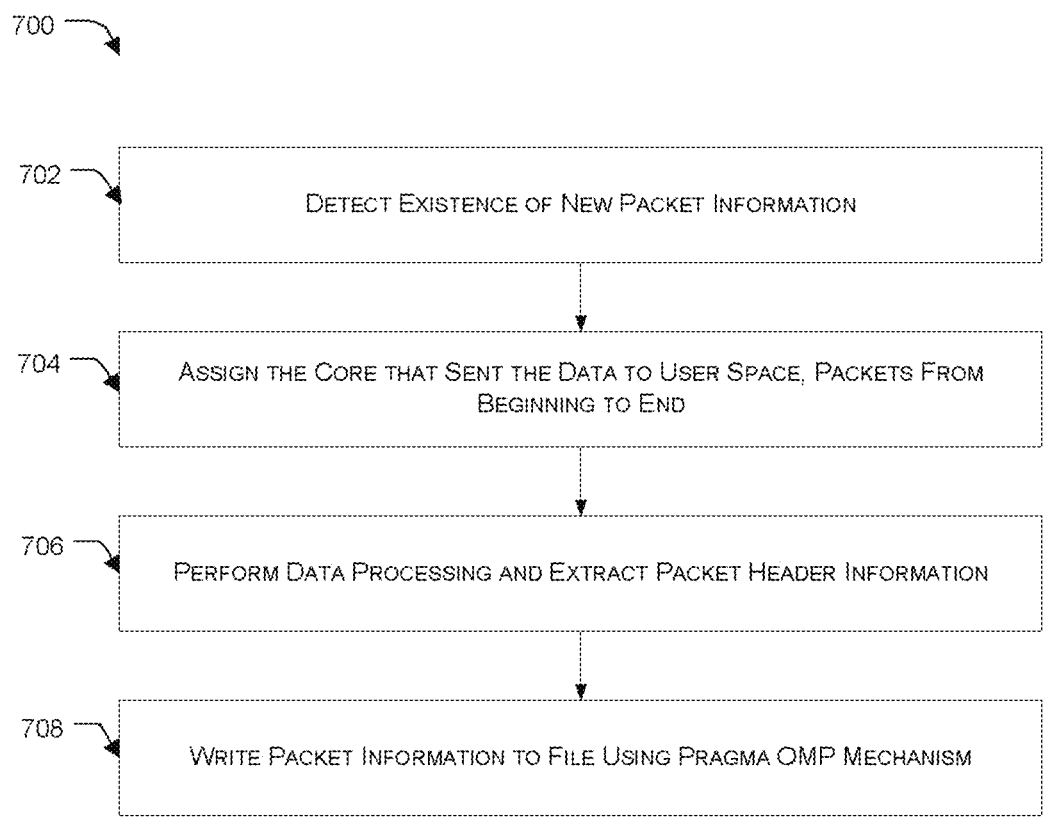
FIG. 7 is a flow diagram illustrating packet information storage processing in accordance with a first embodiment of the present disclosure.

FIG. 7 is a flow diagram 700 illustrating packet information storage processing in accordance with a first embodiment of the present disclosure. Flow 700 illustrates an example Pragma OMP mechanism used for event output storage. When the computing device detects the existence of new packet information, as shown at block 702, the computing device can assign a processing unit (e.g., processor or a processor core) to send the data to user space. The packets may be sent end-to-end in user space, as shown at block 704. The device may then perform data processing and extracts packet header information, as shown at block 706. The device writes packet information (also referred to as packet header information or header information) to a PCAP file using the Pragma OMP mechanism as shown at block 708.

Figure 8:
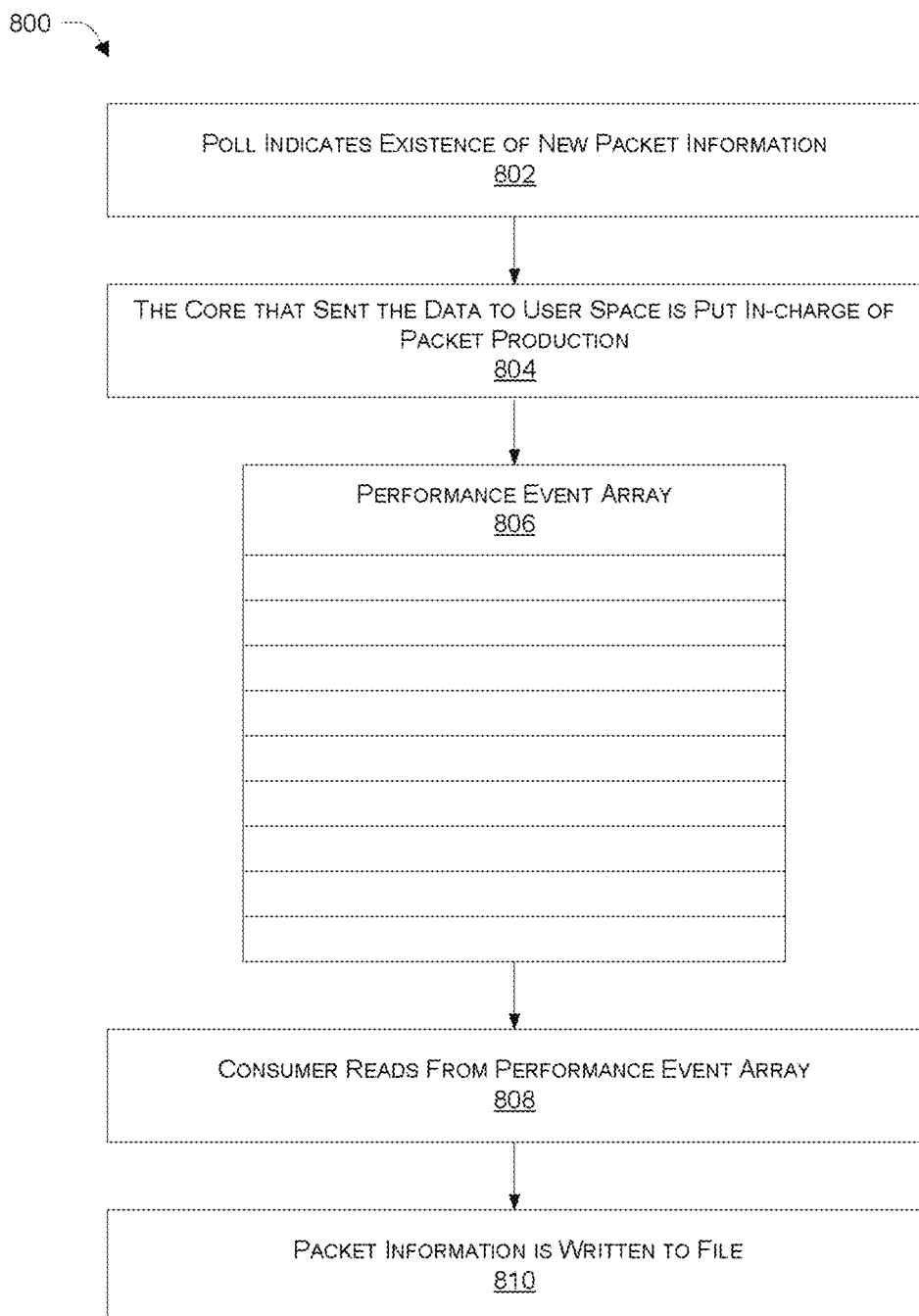
FIG. 8 is a flow diagram illustrating packet information storage processing in accordance with a second embodiment of the present disclosure.

FIG. 8 is a flow diagram 800 illustrating packet information storage processing in accordance with a second embodiment of the present disclosure. The process 800 illustrates an example of the use of an MPSC mechanism for event output storage. When the poll indicates the existence of new packet information, as shown at block 802, the device puts the processing unit that sent the data to user space in charge of packet production, as shown at block 804. The performance event output is written to performance event array 806. The performance event output (that includes packet header information) is written to the first available location in the queue. Data is stored in the queue automatically. In an embodiment, the packet information storage processing should ideally use all available processing units of the computing device while reserving one processing unit for handling interrupt requests. For example, before MPSC is run, interrupt request (IRQ) affinities for the Tx/Rx queues of the NIC can be edited to leave one core free. The designated core will handle consumption, while the rest of the processing units will handle packet parsing and header generation, also called packet production. Each processing unit acts as producer and keeps adding the extracted header information to queue 806. As shown in block 808, an application running in user space (which acts as the consumer) reads from the performance event array, and as shown at block 810 writes the packet information to a file (e.g., a PCAP file). In one embodiment, the consumer continuously goes through the queue and only waits if no new header information has been added. If the consumer finds new header information, it may immediately call a function (e.g., pcap_dump) to write the header information to the PCAP file.

Figure 9A:
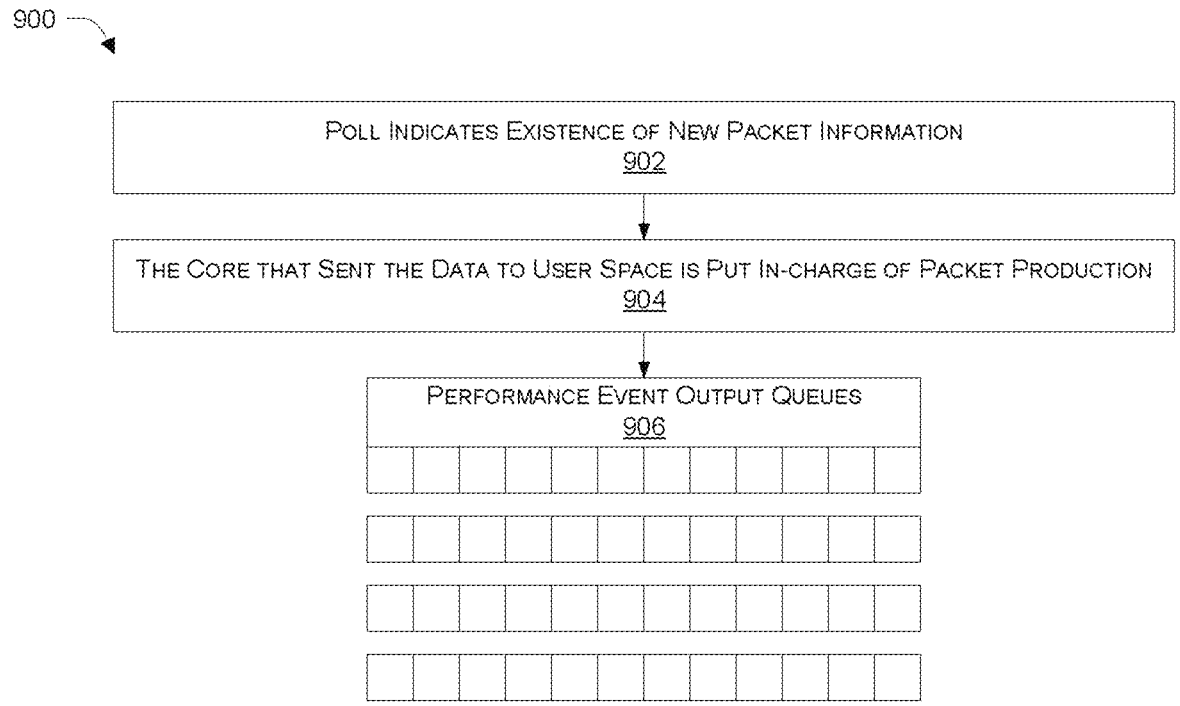
FIG. 9A is a flow diagram illustrating packet information storage processing in accordance with a third embodiment of the present disclosure.

FIG. 9A is a flow diagram 900 illustrating packet information storage processing in accordance with a third embodiment of the present disclosure. Process 900 illustrates an example of the use of the MSPSC mechanism for event output storage. When the poll indicates the existence of new packet information, as shown at block 902, the device puts the processing unit that sent the data to user space in charge of packet production, as shown at block 904. The performance event output is written to performance event output queues 906. The MSPSC mechanism allows each producer (processing unit) to have its own queue that stores data generated by the respective producer. For example, packet header information generated by CPU 0 can be stored in queue 0, and packet header information generated by the CPU 1 can be stored in queue 1. Each processing unit acts as a producer and keeps adding the extracted header information to its respective queues.

Figure 9B:
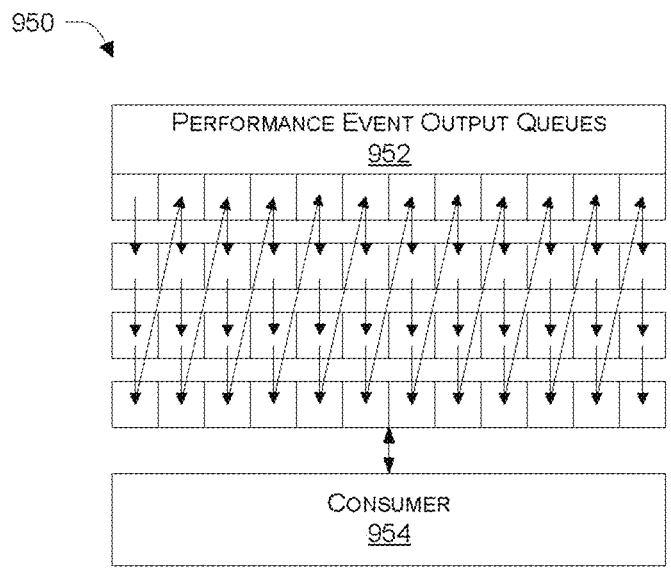
FIG. 9B conceptually illustrates data consumption from performance event output queues by consumer applications in accordance with the third embodiment of the present disclosure.

FIG. 9B conceptually illustrates data consumption from performance event output queues by consumer applications in accordance with the third embodiment of the present disclosure. A consumer application 954 running in user space reads from performance event output queues 952 (e.g., which may represent performance event output queues 906) and writes the packet information to a file. The consumer continuously goes through the queue and only waits if no new header information has been added. In one embodiment, the consumer application 954 traverses the queues in a zig-zag pattern as shown. If the consumer finds new header information, it may immediately calls a function (e.g., pcap_dump) to write the header information to a file.

As noted above, the computing device may select a suitable EOS protocol depending on the network environment, available processing units, and based on EOS performance test output. If the EOS performance test indicates that the performance of the currently used EOS protocol is not satisfactory, the computing device may allocate an additional core for packet production (packet header extraction) and may change to another of the available EOS protocols. Alternatively, the EOS protocol may be a parameter subject to configuration by an administrator.

Figure 10:
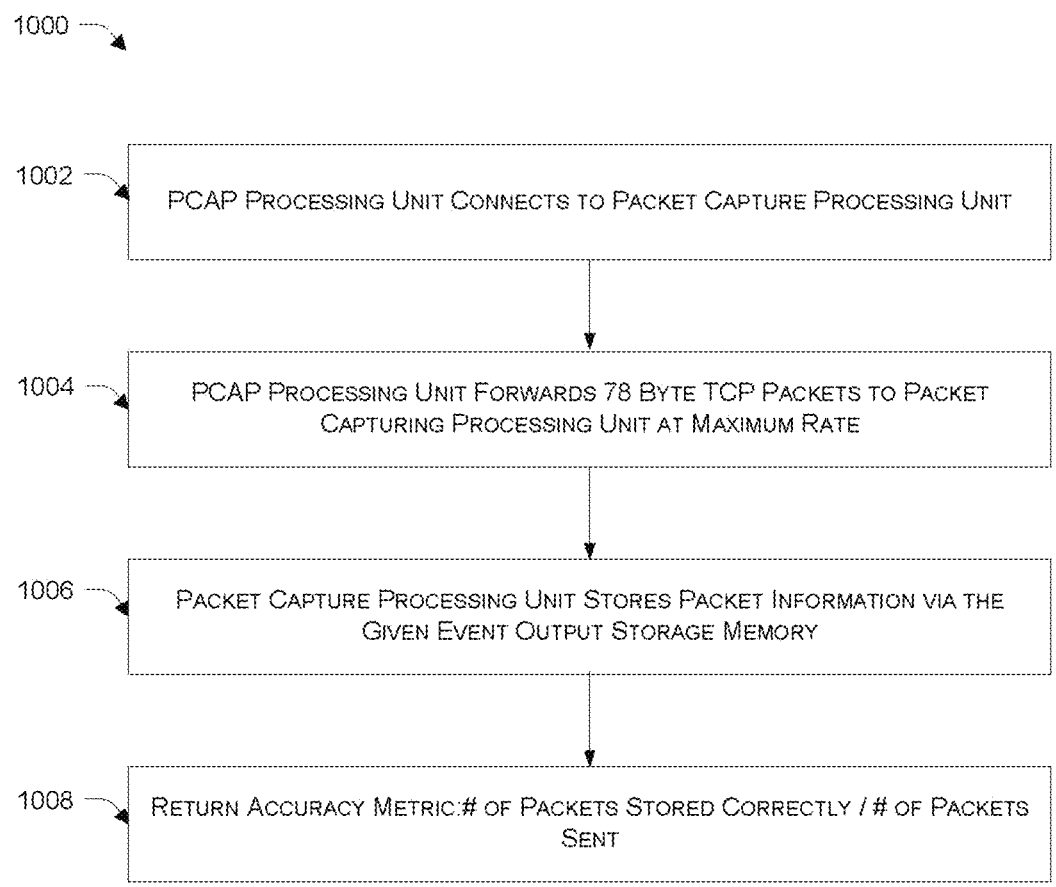
FIG. 10 is a flow diagram illustrating an Event Output Storage (EOS) protocol performance test processing of a particular EOS protocol in accordance with an embodiment of the present disclosure.

FIG. 10 is a flow diagram 1000 illustrating EOS protocol performance test processing of a particular EOS protocol in accordance with an embodiment of the present disclosure. In an embodiment, system 202 determines the performance of the EOS protocol via a closed, wired network comprising of a forwarding computer and capture computer. The forwarding computer forwards TCP or UDP packets to the capture computer at a maximum rate and calculates the accuracy of EOS using a ratio of a number of correctly written packet headers over the total number of packets sent at high speed. A higher ratio indicates better performance.

For testing the performance of a selected EOS protocol for a given network environment, a PCAP replay computing device (producer) may be connected to a packet capture computing device (consumer), as shown at block 1002. In an embodiment, packet header information producing processing unit (referred to as a producer or a replay processor) can act as the PCAP replay computing device, and processing unit running application program in user space can act as the capture computing device. The PCAP packet processing unit forwards a TCP or UDP packet of a predefined size (e.g., 78 bytes) to the packet capturing processing unit at the maximum rate as shown at block 1004. The packet-capturing processing unit stores packet information via a given event output storage memory as shown in block 1006 and check the return accuracy metric, which is indicative of a number of packets stored correctly over a number of packets sent. If the return accuracy is less than a threshold, indicating high packet loss, the performance of the EOS protocol is said to be non-satisfactory.

Figure 11:
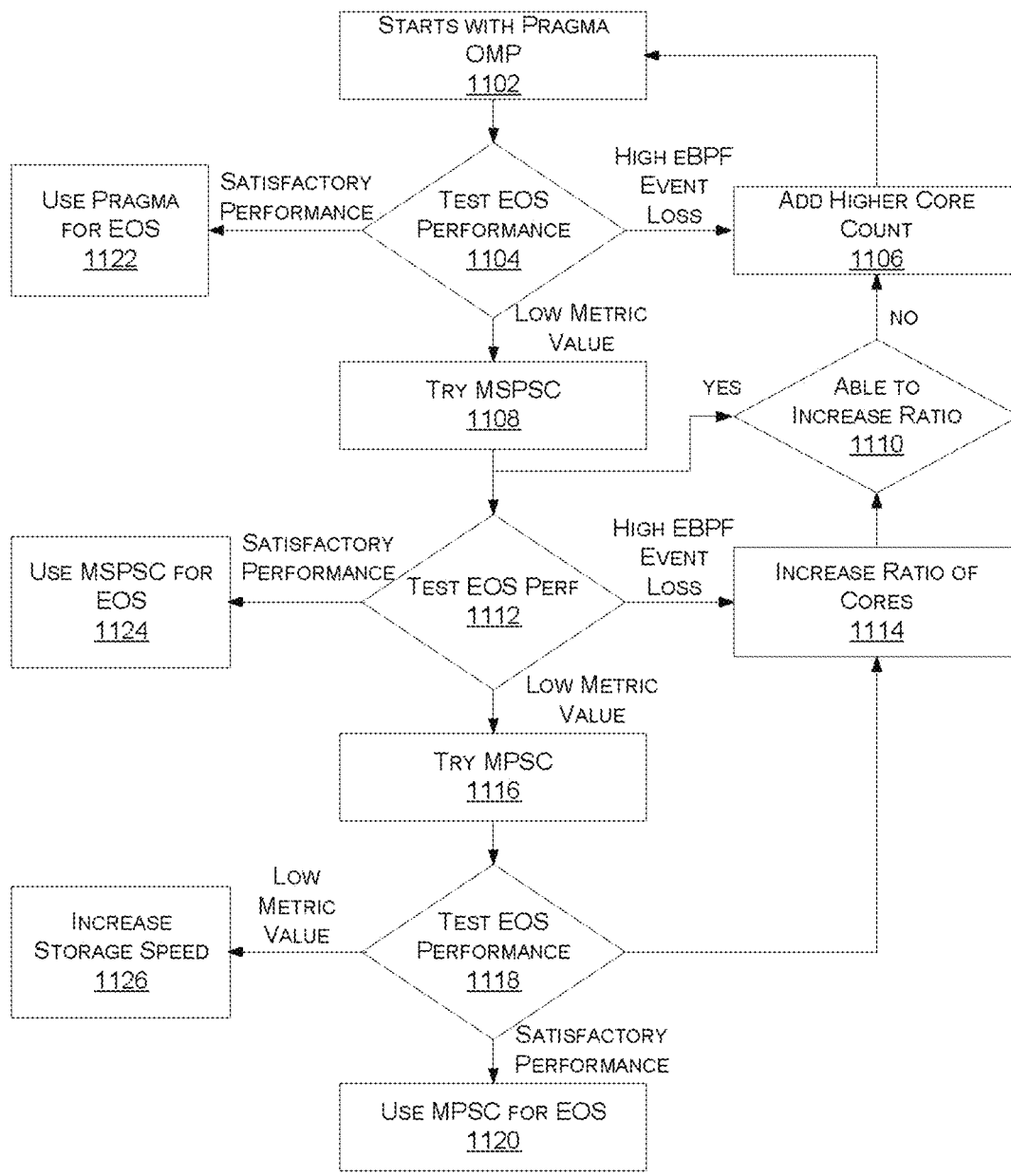
FIG. 11 is a flow diagram illustrating a process of selecting an EOS protocol, engaging an optimal number of processor cores, and determining storage speed in accordance with an embodiment of the present disclosure.

FIG. 11 is a flow diagram illustrating a process of selecting an EOS protocol, engaging an optimal number of processor cores, and determining storage speed in accordance with an embodiment of the present disclosure. In an embodiment, for EOS, a computer device may start with Pragma OMP, as shown at block 1102, as the default EOS protocol. The pragma OMP may be selected as a default, as it is useful in most circumstances. Performance of the pragma OMP approach is tested for a given environment, as shown at block 1104. The performance can be tested using a method described above with reference to FIG. 10. If the test detects high eBPF event loss, the number of processing units assigned to consume the packet information may be increased as shown at block 1106. In an embodiment, the system may add additional processing cores or threads to the capture computer if the eBPF event loss number is too high.

If the test indicates satisfactory performance, the computing device may continue using Pragma OMP as the selected EOS protocol, as shown at block 1122. If the test indicates low event loss, the computing device can try MSPSC, as shown in block 1108, and test performance of the MSPSC protocol, as shown in block 1112. If the performance test indicates very high event loss, the computing device may increase the ratio of cores dedicated to processing the packets (consumer core count), as shown at block 1114. If the performance is found to be satisfactory, the system may continue using MSPSC for EOS. If the performance test indicates very high event loss, the computing device may try MPSC, as shown in block 116, and test performance of the MPSC EOS protocol as shown in block 1118. If the performance of the test indicates a very high event loss, the computing may increase the number of producer cores. If the performance of the MPSC is found to be satisfactory, the computing device may continue using the MPSC for EOS, as shown at block 1120. If test 1118 indicates low event loss, the computing may try to increase storage speed, as shown at block 1126. In an embodiment, the computing device checks if it is able to increase the produce core count, as shown in block 1110. In case the device is not able to increase the producer core count, the device increases the consumer core count. On the increasing speed of the memory unit, the computing device may again start using Pragma OMP and follow the flow to determined suitable EOS.

Figure 12:
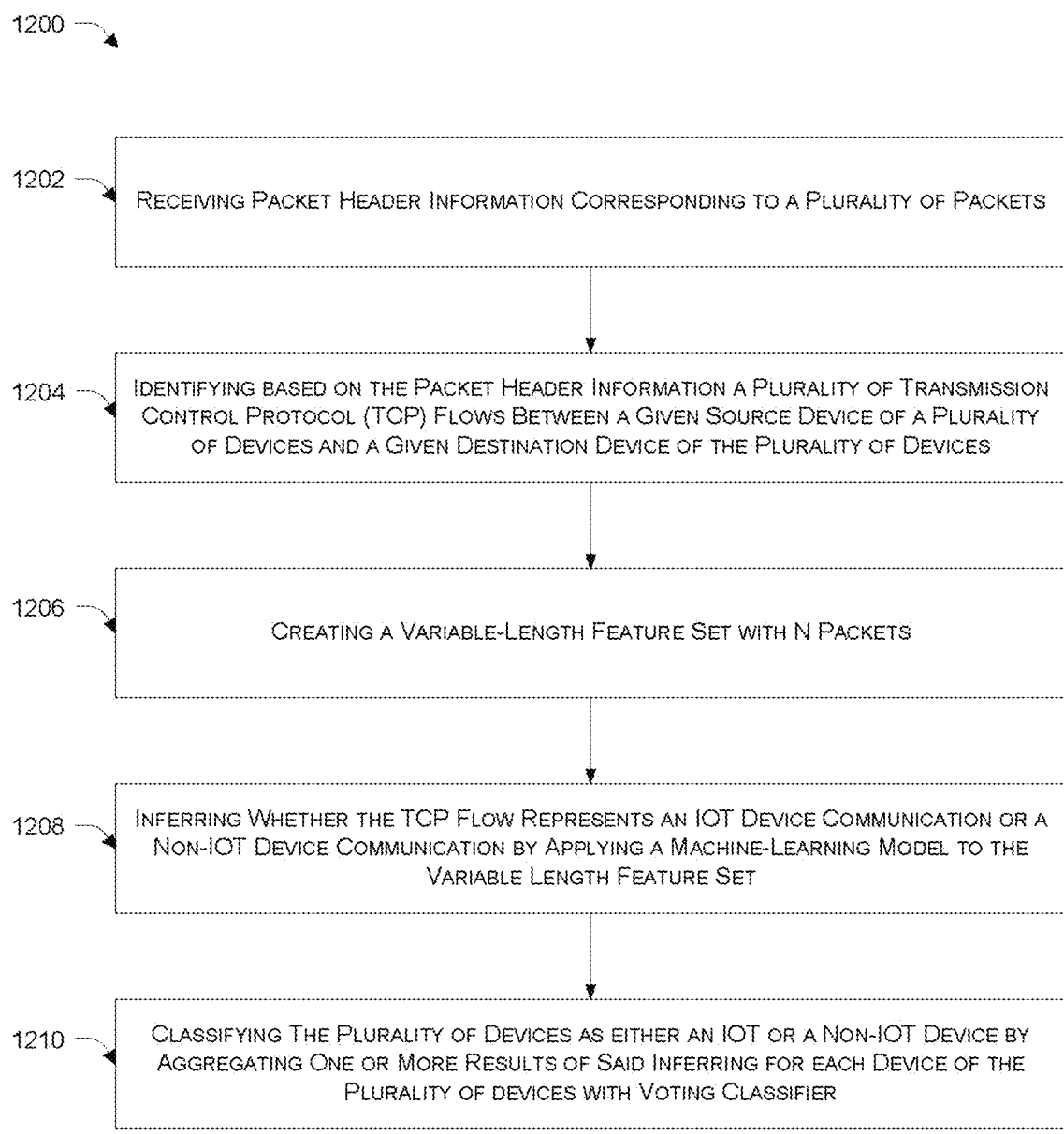
FIG. 12 is a flow diagram illustrating IoT device detection processing in accordance with another embodiment of the present disclosure.

FIG. 12 is a flow diagram 1200 illustrating IoT device detection processing in accordance with another embodiment of the present disclosure. The process 1200 includes steps of receiving packet header information corresponding to a plurality of packets, as shown at block 1202, identifying based on the packet header information a plurality of TCP or UDP flows between a given source device of a plurality of devices and a given destination device of the plurality of devices, as shown at block 1204, and creating a variable-length feature set with N packets as shown at block 1206. The variable-length feature set may be created with a size limited by a predetermined or configurable aggregate number of packets sent and received for the TCP or UDP flow.

The process 1200 further includes steps of inferring whether the TCP or UDP flow represents an IoT device communication or a non-IoT device communication by applying a machine-learning model to the variable length feature set as shown at block 1208 and classifying the plurality of devices as either an IoT device or a non-IoT device by aggregating one or more results (e.g., for approximately between 3 to 10 flows) of said inferring for each device of the plurality of devices with a voting classifier as shown at block 1210. Each device may then be classified as an IoT or a non-IoT device based on the aggregated results of the multiple flows and is concluded to be an IoT or a non-IoT device, for example, based on how many of the flows associated with the particular device were classified as communications of an IoT device. If, for a majority of the flows, the device is classified as an IoT device, the process may proceed to tag the device as an IoT device.

Figure 13:
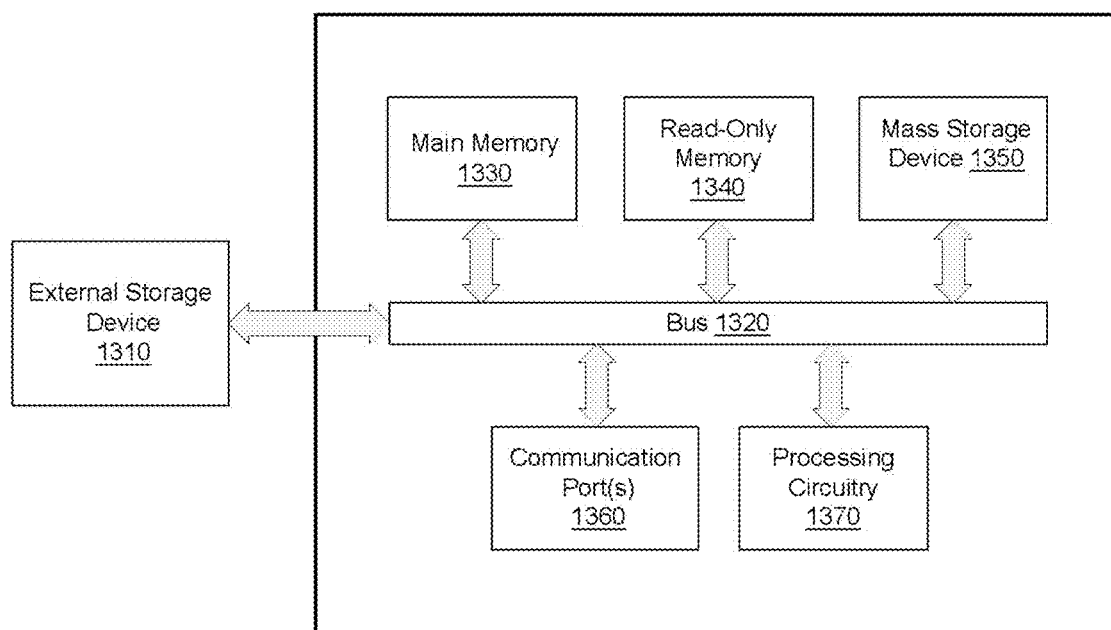
FIG. 13 illustrates an example computer system in which or with which embodiments of the present disclosure may be utilized.

FIG. 13 illustrates an exemplary computer system 1300 in which or with which embodiments of the present disclosure may be utilized. As shown in FIG. 13, the computer system includes an external storage device 1340, a bus 1330, a main memory 1320, a read-only memory 1320, a mass storage device 1325, one or more communication ports 1310, and one or more processing resources (e.g., processing circuitry 1305). In one embodiment, computer system 1300 may represent some portion of one or more computer systems (e.g., computing device 106) for performing one or both of the kernel space packet processing and the IoT device detection processing described herein.

Those skilled in the art will appreciate that computer system 1300 may include more than one processing resource and communication port 1310. Non-limiting examples of processing circuitry 1305 include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processing circuitry 1305 may include various modules associated with embodiments of the present disclosure.

Communication port 1310 can be any of an RS-232 port for use with a modem-based dialup connection, a 10/100 Ethernet port, a Gigabit or 10 Gigabit port using copper or fiber, a serial port, a parallel port, or other existing or future ports. Communication port 1310 may be chosen depending on a network, such as a Local Area Network (LAN), Wide Area Network (WAN), or any network to which the computer system connects.

Memory 1315 can be Random Access Memory (RAM), or any other dynamic storage device commonly known in the art. Read only memory 1320 can be any static storage device(s) e.g., but not limited to, a Programmable Read Only Memory (PROM) chips for storing static information e.g. start-up or BIOS instructions for the processing resource.

Mass storage 1325 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1330 communicatively couples processing resource(s) with the other memory, storage and communication blocks. Bus 1330 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 1330 to support direct operator interaction with computer system. Other operator and administrative interfaces can be provided through network connections connected through communication port 1360. External storage device 604 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the disclosure, other and further embodiments may be devised without departing from the basic scope thereof.

What is claimed is:

1. A method performed by a processing resource of a computer system, the method comprising:
   receiving, in kernel space of an operating system of the processing resource, a packet;
   ascertaining, in the kernel space, whether a destination address of the packet matches a logical address of the computer system;
   when said ascertaining is affirmative, forwarding the packet to user space of the operating system by passing the packet up a network stack implemented by the operating system;
   when said ascertaining is negative, determining, in the kernel space, whether the packet is associated with one or more predetermined protocols used by Internet of Things (IoT) devices;
   when said determining is affirmative:
      extracting a header information from the packet; and
      sending the header information to the user space for use in a subsequent IoT device detection processing; and
   when said determining is negative, dropping the packet.

2. The method of claim 1, wherein the one or more predetermined protocols comprise Transmission Control Protocol (TCP) and User Datagram Protocol (UDP).

3. The method of claim 1, wherein said ascertaining and said determining are performed by a packet processing program running in the kernel space.

4. The method of claim 3, wherein the packet processing program comprises an extended Berkeley Packet Filter (eBPF) program.

5. The method of claim 4, wherein the packet is conveyed to the eBPF program by an eXpress Data Path (XDP) hook implemented within a network device driver of the computer system.

6. The method of claim 4, wherein said sending the header information to the user space comprises storing the header information using a suitable data structure in a memory of the computer system that is accessible to the user space.

7. The method of claim 6, further comprising:
   reading, by the user space, the header information from the data structure; and
   storing, by the user space, the header information to packet capture file on a storage device.

8. The method of claim 6, wherein the header information is stored in the memory using an event output storage (EOS) protocol selected from a group of EOS protocols comprising a pragma OpenMP (OPM) protocol, a Multi-Producer Single Consumer (MPSC) protocol, and a Multiple Single Producer Single Consumer (MSPSC) protocol.

9. A computer system comprising:
   a processing resource;
   a non-transitory computer-readable medium, coupled to the processing resource, having stored therein instructions that when executed by the processing resource cause the processing resource perform a method comprising:
      receiving, in kernel space of an operating system of the processing resource, a packet;
      ascertaining, in the kernel space, whether a destination address of the packet matches a logical address of the computer system;
      when said ascertaining is affirmative, forwarding the packet to user space of the operating system by passing the packet up a network stack implemented by the operating system;
      when said ascertaining is negative, determining, in the kernel space, whether the packet is associated with one or more predetermined protocols used by Internet of Things (IoT) devices;

when said determining is affirmative:

extracting a header information from the packet; and sending the header information to the user space for use in a subsequent IoT device detection processing; and when said determining is negative, dropping the packet.

10. The computer system of claim 9, wherein the one or more predetermined protocols comprise Transmission Control Protocol (TCP) and User Datagram Protocol (UDP).

11. The computer system of claim 9, wherein said ascertaining and said determining are performed a packet processing program running in the kernel space.

12. The computer system of claim 11, wherein the packet processing program comprises an extended Berkeley Packet Filter (eBPF) program.

13. The computer system of claim 12, wherein the packet is conveyed to the eBPF program by an eXpress Data Path (XDP) hook implemented within a network device driver of the computer system.

14. The computer system of claim 12, wherein said sending the header information to the user space comprises storing the header information using a suitable data structure in a memory of the computer system that is accessible to the user space.

15. A non-transitory computer-readable storage medium embodying a set of instructions, which when executed by one or more processing resources of a computer system, causes the one or more processing resources to perform a method comprising:

receiving, in kernel space of an operating system of a processing resource of the one or more processing resources, a packet;

ascertaining, in the kernel space, whether a destination address of the packet matches a logical address of the computer system;

when said ascertaining is affirmative, forwarding the packet to user space of the operating system by passing the packet up a network stack implemented by the operating system;

when said ascertaining is negative, determining, in the kernel space, whether the packet is associated with one or more predetermined protocols used by Internet of Things (IoT) devices;

when said determining is affirmative:

extracting a header information from the packet; and sending the header information to the user space for use in a subsequent IoT device detection processing; and when said determining is negative, dropping the packet.

16. The non-transitory computer-readable storage medium of claim 15, wherein the one or more predetermined protocols comprise Transmission Control Protocol (TCP) and User Datagram Protocol (UDP).

17. The non-transitory computer-readable storage medium of claim 15, wherein said ascertaining and said determining are performed a packet processing program running in the kernel space.

18. The non-transitory computer-readable storage medium of claim 17, wherein the packet processing program comprises an extended Berkeley Packet Filter (eBPF) program.

19. The non-transitory computer-readable storage medium of claim 18, wherein the packet is conveyed to the eBPF program by an eXpress Data Path (XDP) hook implemented within a network device driver of the computer system.

20. The non-transitory computer-readable storage medium of claim 18, wherein said sending the header information to the user space comprises storing the header information using a suitable data structure in a memory of the computer system that is accessible to the user space.

\* \* \* \* \*